(12) United States Patent
Hyder et al.

(10) Patent No.: US 9,972,018 B2
(45) Date of Patent: May 15, 2018

(54) SYSTEMS AND METHODS FOR PROVIDING A RELEVANT LINK DESTINATION

(75) Inventors: Adam Hyder, Los Altos, CA (US); Chyr-Chong Joseph Ting, San Jose, CA (US)

(73) Assignee: EXCALIBUR IP, LLC, New York, NY (US)

( * ) Notice: Subject to any disclaimer, the term of this patent is extended or adjusted under 35 U.S.C. 154(b) by 3005 days.

(21) Appl. No.: 11/609,107

(22) Filed: Dec. 11, 2006

(65) Prior Publication Data

US 2008/0140504 A1 Jun. 12, 2008

(51) Int. Cl.
*G06Q 30/00* (2012.01)
*G06Q 30/02* (2012.01)
*G06Q 10/10* (2012.01)

(52) U.S. Cl.
CPC ......... *G06Q 30/02* (2013.01); *G06Q 10/1053* (2013.01); *G06Q 30/0241* (2013.01); *G06Q 30/0255* (2013.01); *G06Q 30/0256* (2013.01); *G06Q 30/0269* (2013.01); *G06Q 30/0273* (2013.01)

(58) Field of Classification Search
CPC ........... G06Q 30/0269; G06Q 30/0255; G06Q 30/0256
See application file for complete search history.

(56) References Cited

U.S. PATENT DOCUMENTS

| | | | | |
|---|---|---|---|---|
| 6,895,387 | B1* | 5/2005 | Roberts et al. | 705/14.47 |
| 8,185,514 | B1* | 5/2012 | Skrenta | G06F 17/30867 707/708 |
| 2005/0097204 | A1* | 5/2005 | Horowitz et al. | 705/14 |
| 2006/0282304 | A1* | 12/2006 | Bedard | G06F 17/30867 705/7.33 |
| 2008/0040341 | A1* | 2/2008 | York et al. | 707/5 |
| 2008/0201472 | A1* | 8/2008 | Bistriceanu | G06Q 30/02 705/14.61 |

* cited by examiner

*Primary Examiner* — Michael Bekerman
(74) *Attorney, Agent, or Firm* — James J. DeCarlo; Greenberg Traurig, LLP (57) ABSTRACT

Methods and systems of providing advertisements to a user are disclosed. A user indication of preference for an item is received. A first hyperlink that references a first webpage of an advertiser is associated with an advertisement of the item if the user indication of preference for the item is indicative of a first level of interest in the item. A second hyperlink that references a second webpage of an advertiser is associated with an advertisement of the item is the user indication of preference for the item is indicative of a second level of interest in the item. The advertisement is presented to the user on an advertisement provider webpage.

17 Claims, 8 Drawing Sheets

| User Profile | |
|---|---|
| Attribute | Value |
| First Name | Moe |
| Last Name | Johnson |
| Address | 123 Linux Rd. |
| Item of Interest | Vehicle |
| State of Interest | Browse |

| User Profile | |
|---|---|
| Attribute | Value |
| First Name | Moe |
| Last Name | Johnson |
| Address | 123 Linux Rd. |
| Item of Interest | Vehicle |
| State of Interest | Purchase |

SYSTEMS AND METHODS FOR PROVIDING A RELEVANT LINK DESTINATION

BACKGROUND

1. Field

The present disclosure relates to Internet advertisement. In particular, it relates to systems and methods of providing relevant link destinations for advertisement displayed to a user.

2. General Background

Internet advertising has become a prime direct marketing channel for companies offering goods and services. Furthermore, Internet advertising offers the unprecedented opportunity to tailor individualized ads to online users because online users generate behavioral and demographic data that provide insight into their goals and preferences. User behavior can be established by tracking user activities online, storing user preferences, etc. In conventional systems, advertisements are associated with a fixed link destination. That is, a hyperlink is associated with the advertisement and a single landing page is referenced as the link destination.

SUMMARY

In one aspect, a user indication of preference for an item is received. A first hyperlink that references a first webpage of an advertiser is associated with an advertisement of the item if the user indication of preference for the item is indicative of a first level of interest in the item. A second hyperlink that references a second webpage of an advertiser is associated with an advertisement of the item if the user indication of preference for the item is indicative of a second level of interest in the item. The advertisement is presented to the user on an advertisement provider webpage.

In another aspect, the user indication of preference for an item is explicitly received from a user. Alternatively, the user indication of preference for an item is implicitly derived from user Internet activity.

In a further aspect, the advertisement is presented to the user on an advertisement provider webpage.

In a further aspect, the first level of interest is a low level of interest and the second level of interest is a high level of interest.

In a further aspect, the advertisement of the item is associated with a third hyperlink that references a third webpage of the advertiser if the user indication of preference for the item is indicative of a third level of interest in the item.

In another aspect, the user is redirected to the first webpage when the user selects the advertisement if the advertisement has been associated with the first hyperlink. The user can be redirected to the second webpage when the user selects the advertisement if the advertisement has been associated with the second hyperlink.

In another aspect, the advertisement provider webpage is a results webpage that includes web search results.

In another aspect, the first level of interest comprises user interest in browsing the item and the second level of interest comprises user interest in purchasing the item.

In another aspect, the advertisement is selected from a plurality of advertisements based on the indication of preference for the item. The user indication of preference is stored in a user profile.

In a further aspect, a selection of the advertisement is received from the user. An advertiser can then be charged a first quantity of money if the advertisement of the item has been associated with the first hyperlink. The advertiser can be charged a second quantity of money if the advertisement of the item has been associated with the second hyperlink, the first quantity of money being greater than the second quantity of money.

In another aspect, the first webpage is a catalog webpage, and the second webpage is a purchasing page. In another example, the first webpage is a job searching webpage and the second webpage is a job applying webpage.

In one aspect, there is a system of providing advertisements to a user. The system comprises a user behavior collection module, a link destination selection module, and an advertisement rendering module. The user behavior collection module receives a user indication of preference for an item. The link destination selection module associates to an advertisement of the item a first hyperlink that references a first webpage of an advertiser if the user indication of preference for the item is indicative of a low level of interest in the item. The link destination selection module can be further configured to associate to the advertisement of the item a second hyperlink that references a second webpage of the advertiser if the user indication of preference for the item is indicative of a high level of interest in the item. The advertisement rendering module presents the advertisement to the user on an advertisement provider webpage.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

Various methods and systems for advertisement delivery are disclosed. Advertisements and listings online are conventionally associated with a hyperlink. As disclosed herein, a hyperlink that is relevant to the user's preferences and levels of interest is selected and associated with the advertisement or listing. User levels of interest in an item or service are determined based on historical data such a user search requests and accessed web pages. Utilizing the user's levels of interests in an item, an advertisement or listing for such item or listing can be associated with a hyperlink that would direct the user to a relevant link destination if the user followed the hyperlink of the advertisement or listing. Likewise, the user's levels of interests in a service can be used to associate an advertisement or listing to a hyperlink that would direct the user to a relevant link destination if the user followed the hyperlink of the advertisement or listing.

As used herein, a link destination is generally a webpage or another target that a hyperlink references. In one embodiment, a link destination can be a landing page in a website of the advertiser. In one example, the landing page of the advertiser can be a catalog, viewing page, or a purchase page.

Therefore, relevant link destination for an item is provided to users according to the user's interest in the item. The user level of interest on an item is determined based on previous user interactions. The item can be advertised with an advertisement or listing displayed on a webpage or other user interface. The advertisement or listing is dynamically associated with a hyperlink. The hyperlink can have an associated link destination that is displayed when the user selects the hyperlink. The hyperlink can be determined based on the link destination to be presented to the user. Thus, a link destination that is relevant to the user level of interest is presented to the user. The link destination is relevant to the user if the link destination is appropriate to the level of interest of the user. Furthermore, the hyperlink can be a link to a website of the advertisement provider 140, which in turn is mapped to an advertiser link that references the link destination (e.g., landing page).

In a further embodiment, monetization for advertisement can be provided. For example, an advertisement provider that displays the advertisements of an advertiser can allot a higher cost-per-click to advertisements that have a more relevant link destination. In one embodiment, advertisers can be provided with the option to select whether to advertise with relevant link destination. If an advertiser chooses to do so, the advertiser can be charged more because the link destination is a more targeted approach to direct potential customers to the right web pages of the advertiser.

Figure 1:
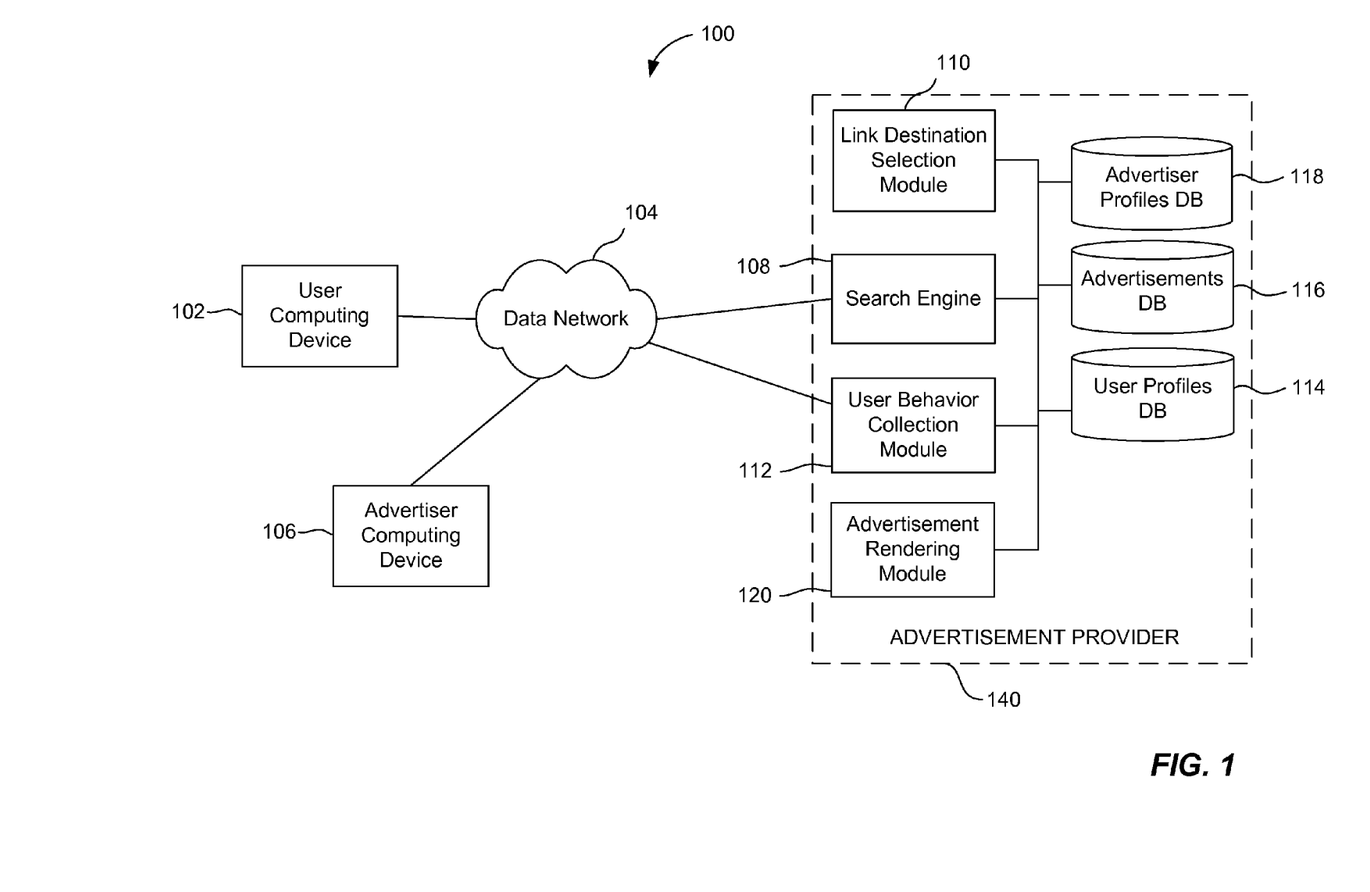
FIG. 1 depicts a component diagram of a system for providing advertisements to a user according to one embodiment.

FIG. 1 depicts a component diagram of a system for providing advertisements to a user according to one embodiment. As such the advertisement provider 140 can be a business entity that owns and operates a computer infrastructure connected to a data network 104 in order to provide online advertisements that can be presented to users. Users can access the services provided by the advertisement provider 140 via a data network 104. In one embodiment, the data network 104 is the Internet. In another embodiment, the data network 104 is an intranet. A user can utilize a user computing device 102 to communicate via the data network 104 with one or more computing modules and or services that are part of the computer infrastructure managed by the advertisement provider 140.

In one embodiment, the computer device 102 can be configured with a web browser that allows the user computing device 102 to send data to and receive data from a network server 118. The computing device 102 communicates with the one or more modules of the infrastructure of the service provider 140 to render received web pages as well as transmit user input to the advertisement provider 140. In another embodiment, the user computing device 102 can communicate through the data network 104 via any client-side application configured to communicate in a pre-determined protocol with the network server 118.

In another embodiment, the advertisement provider 140 can further be configured with a search engine 108. The search engine 108 can include logic to receive general web searches and populate the most relevant result data. The search engine 108 can be configured to search Internet websites for content that matches or is relevant to the search entered by the user. The search engine 108 can provide a user behavior collection module 112 user search data such as search queries, terms, keywords, etc., used by the user.

As such, the advertisement provider 140 can include a user behavior collection module 112 that allows recording search data. For example, the user behavior collection module 112 can store search criteria such as category of the search criteria, location, terms and keywords. In addition, the user behavior collection module 112 can also track search results such as actual text and hyperlinks in the results page, etc.

The user behavior collection module 112 can be configured to store the click through rate of ads as they relate to a specific user. In a further embodiment, the user behavior collection module 112 can also store the links and/or ads that a user had previously selected in connection with a specific advertisement.

As the user interacts with the advertisement provider 140, the user behavior collection module 112 can also be configured to track user activity and record such user activity in multiple data repositories. For example, the user behavior collection module 112 can record user activity such as web requests, search queries, search results, listings saved, printed, e-mailed, listings used, bid, bought, applied for, viewed, discarded, requested media, uploaded media, etc. User activity can be stored in a user profiles database 114.

In addition to implicit data collected from user behavior online, the user behavior collection module 112 can also collect explicit data provided by the user. For example, the user behavior collection module 112 can record user demographic information entered by the user, such as age, gender, name, date of birth, etc., at a user profiles database 114.

Therefore, user behavior online can be collected and recorded in a user profile, or another storing mechanism such as cookies, in order to establish the interest of the user in one or more items. Furthermore, the level of interest of the user in such items can also be recorded. For example, within the context of Internet shopping, the user may express an interest in simply viewing or browsing a product, while another user may be ready to purchase an item. Therefore, the same advertisement can be provided to both users, with the link destination for the first user being a browsing page and with the link destination for the second user being a purchase page.

In a further embodiment, a link destination selection module 110 can be included as part of the advertisement provider 140 infrastructure. The link destination selection module 110 can be configured with logic to query the level of interest of a user in an item, product or service from a user profile in the user profiles database 114. Once the level of interest is determined, the link destination selection module 110 can provide to the advertisements rendering module 120 a link to be associated with the advertisements presented to the user. The link destination selection module 110 can obtain the appropriate link to be associated with the advertisement from one or more data sources. In one embodiment, the possible links to be associated with the advertisement are stored in the advertisements database 116. In another embodiment, the possible links to be associated with the advertisement are stored in relation to each of the advertiser profile in the advertiser profiles database 118.

As such, the link destination selection module 118 can associate to an advertisement of an item, or product a hyperlink that references a webpage of an advertiser depending on the user indication of preference for the item or product. For example, the link destination selection module 118 can be configured to associate to the advertisement of the item a first hyperlink that references a first webpage of the advertiser if the user indication of preference for the item is indicative of a low level of interest in the item. Likewise, the link destination selection module 118 can be configured to associate to the advertisement of the item a second hyperlink that references a second webpage of the advertiser if the user indication of preference for the item is indicative of a high level of interest in the item. As such depending on the level of interest, or in general the state of the user with respect to obtaining the item, the hyperlink associated with the advertisement can be dynamically assigned.

In one example, in the context of job searching, the user might be browsing, researching, evaluating, narrowing, considering to purchase, or ready to purchase a product. Utilizing the level of interest of the user, the link destination selection module 110 can take the user to different landing pages on the advertiser site. For example, if the user is ready to make a purchase, the link destination selection module 110 can associate the advertisements to the order page of the advertiser. If the user is just researching, then the link destination selection module 110 will associate the advertisement to the product detail page.

In another example, in the context of an online job listing service, the link destination selection module 110 can determine in what stage of the job seeking cycle the jobseeker is. For example, if the jobseeker has not applied to a job yet and has selected the company profile page, then the jobseeker is probably just browsing and researching about the company. Thus, the link destination selection module 110 can associate the job seeker to the corporate career page. In another example, when the jobseeker is ready to apply for a job, the link destination selection module 110 can associate the advertisement with a link destination that references a landing page where the jobseeker can apply for the job.

The system 100 can also include an advertisement rendering module 120 that permits the network server 118 to communicate with a computing device 102. For example, the advertisement rendering module 120 can be a web server. As it is known in the art, a web server can be configured to submit Internet pages to be rendered at a web browser on the user computing device 102.

The advertisement rendering module 120 can be configured to request advertisements from the advertisements database 116. In addition, the advertisement rendering module 120 can be configured to present the advertisements to the user computing device 102 according to user preferences, history data, and online behavior in general of the user. For example, a discount/coupon can be displayed in the advertisement if the user is deemed to be ready to purchase an item. In a further embodiment, the advertisement rendering module 120 can use one or more algorithms to perform the selection of the most relevant ads that are to be presented to the user.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
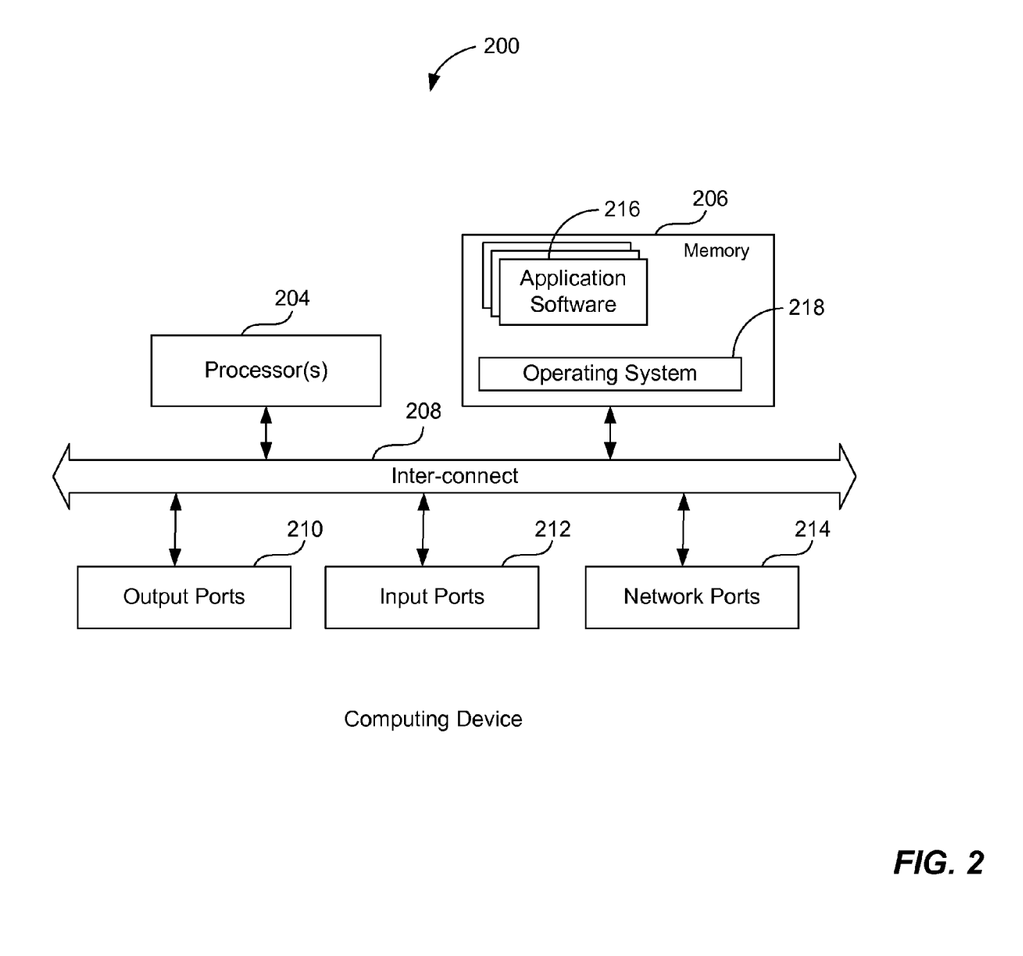
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the jobseeker computing device 102. In another example, the computing device 200 can be utilized to process calculations, execute instructions, receive and transmit digital signals, receive and transmit search queries, and hypertext, as required by the link destination module 110, the search engine 108, the user behavior module 112, and the advertisement rendering module 120.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
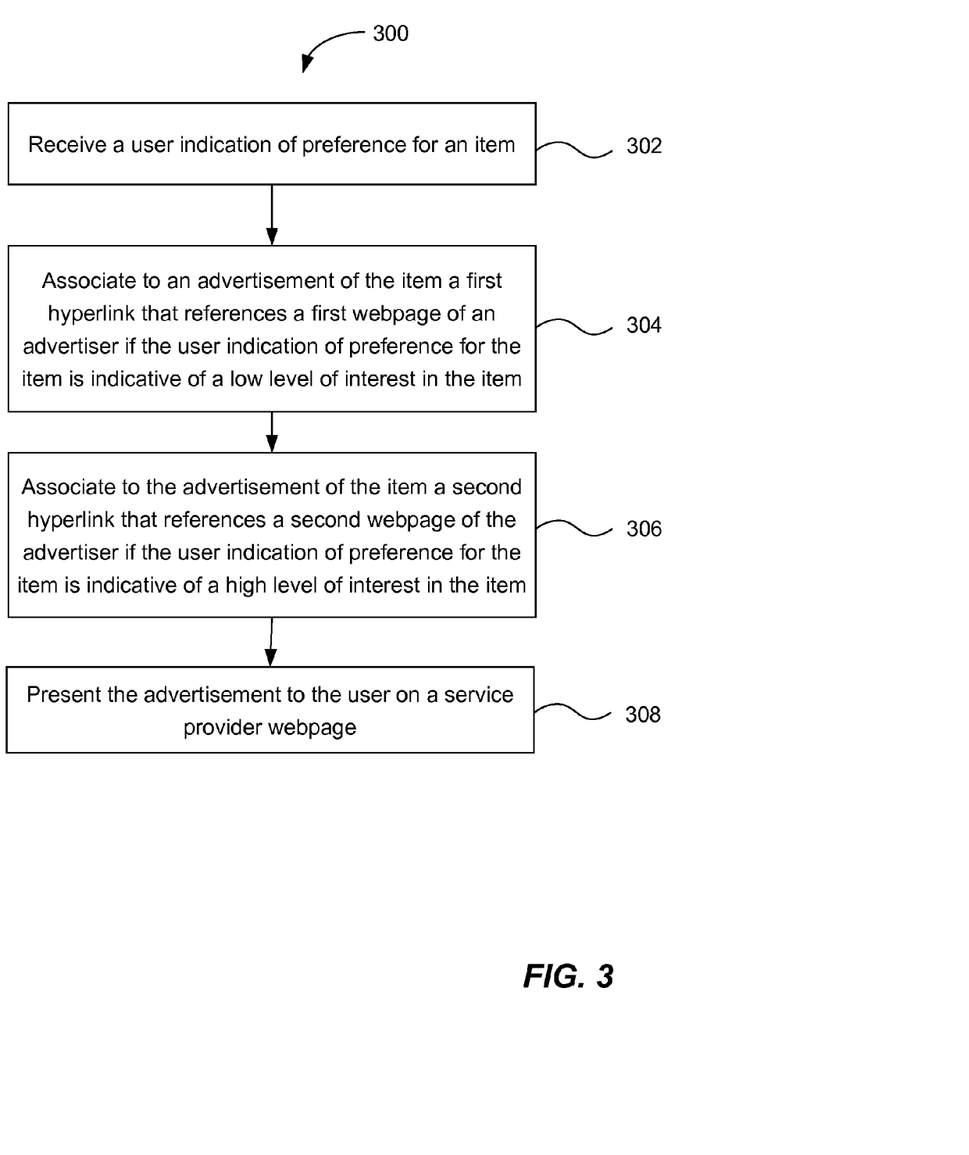
FIG. 3 depicts a flow diagram of a process for providing a relevant link destination for an advertisement according to one embodiment.

FIG. 3 depicts a flow diagram of a process for providing a relevant link destination for an advertisement according to one embodiment. At process block 302 a user indication of preference for an item is received from the user. The user indication can be received in one or more ways. For example, the user indication of preference for an item can be received implicitly and determined from user behavior such as search queries entered by the user on a web search service. In another example, the user indication of preference for an item can be received implicitly through previously selected advertisements, followed links, or any other online user activity.

In yet another example, the user indication of preference can be an explicit indication entered by the user such as configuring the preferences of the user to indicate that the user likes or is interested in purchasing an item, accessing, registering, subscribing to a service, applying for a posted job, bidding for an item, etc. Furthermore, the item can be a product that has been offered for sale online, a service, a listing such as a job listing, or any other item in which a user can express an interest. Process 300 continues at process block 304.

At process block 304, a first hyperlink is associated with an advertisement of the item. The first hyperlink can reference the first web page of an advertiser of the item if the user indication of preference for the item indicates a low level of interest in the item. As such, if the user has expressed low interest in the item, a page that allows the user to browse different items or for different models of the same item would be more appropriate for that user. The first hyperlink associated with the advertisement can therefore be a hyperlink to a first web page which is a landing page to a user interface that allows the user to browse and view catalogued items, etc. Process 300 continues at process block 306.

At process block 306 a second hyperlink that references a second web page of the advertiser is associated with the advertisement of the item. The second hyperlink is associated if the user indication of preference for the item is indicative of a high level of interest. In one example, the hyperlink is referenced to a second web page that is more appropriate to a user that is highly interested in the item. For example, a user that is ready to purchase an item can be presented with a landing page that is utilized to order the item and make payment for the item. In another example, once the user is ready to apply for a job, the second web page can be a web form wherein the jobseeker can enter the appropriate jobseeker information and apply for the job. As such, if the jobseeker has expressed a high level of interest in a particular job listing the jobseeker can be deemed to have enough interest to be directed to a landing page for applying for a job.

Therefore, multiple levels of interest can be expressed by a user. In one example, within the context of online retail sales, an interest structure can be created that is reflective of various levels of interest during the cycle of purchasing a product. Therefore, indicators of the state of the user with respect to purchasing the product can be stored in association to the user. Indicators such as browsing, researching, evaluating, narrowing, considering to purchase, and ready to purchase can be different user levels of the cycle of purchasing a specific product. Based the user level or state, the user can be presented with an appropriate landing page. This can save time to the user and also provide a more appropriate web page of the advertiser. Process 300 continues at process block 306. At process block 306 the advertisement is presented to the user on an advertisement provider webpage. As previously discussed, the advertisement can be linked to a relevant destination such as a landing page in the advertiser's website.

Figure 4:
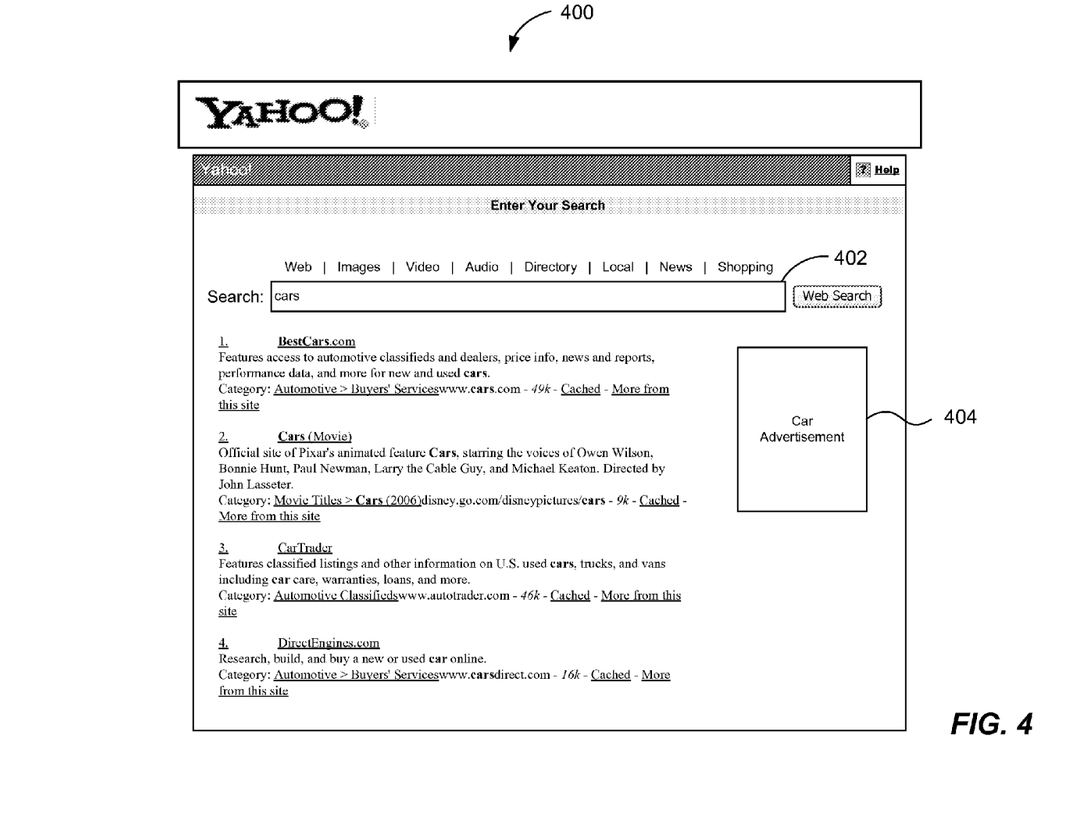
FIG. 4 depicts an exemplary user interface for displaying an advertisement with an associated relevant link destination according to another embodiment.

FIG. 4 depicts an exemplary user interface for displaying an advertisement with an associated relevant link destination according to another embodiment. User interface 400 displays a web page hosted by the advertisement provider 140. The user interface 400 can display an advertisement 404. The web page of user interface 400 can be, for example, for a web search service that allows users to enter search queries on a search box 402. In other embodiments, the user interface provided by the advertisement provider 140 can be a web page displaying any other online content. As previously discussed, the advertisement 404 can have an associated hyperlink that references a link destination relevant to the state of the user with respect to the item. In other words, the link destination of the hyperlink will direct the user to a web page that is appropriate and more relevant to the user state with respect to the item. As such, the hyperlink associated with advertisement 404 is a dynamically associated hyperlink. As such, in one example, the advertisement 404 can be associated with a hyperlink that references a web page or a landing page that allows the user to browse for cars. In another example, advertisement 404 can reference a landing page that allows users to research for one or more cars. In yet another example, the hyperlink associated with advertisement 404 can be associated with a hyperlink that can allow users to evaluate financing of a vehicle before purchasing. In yet another example, the advertisement 404 can be associated with a hyperlink that references a web page for purchasing a vehicle online.

Figure 5:
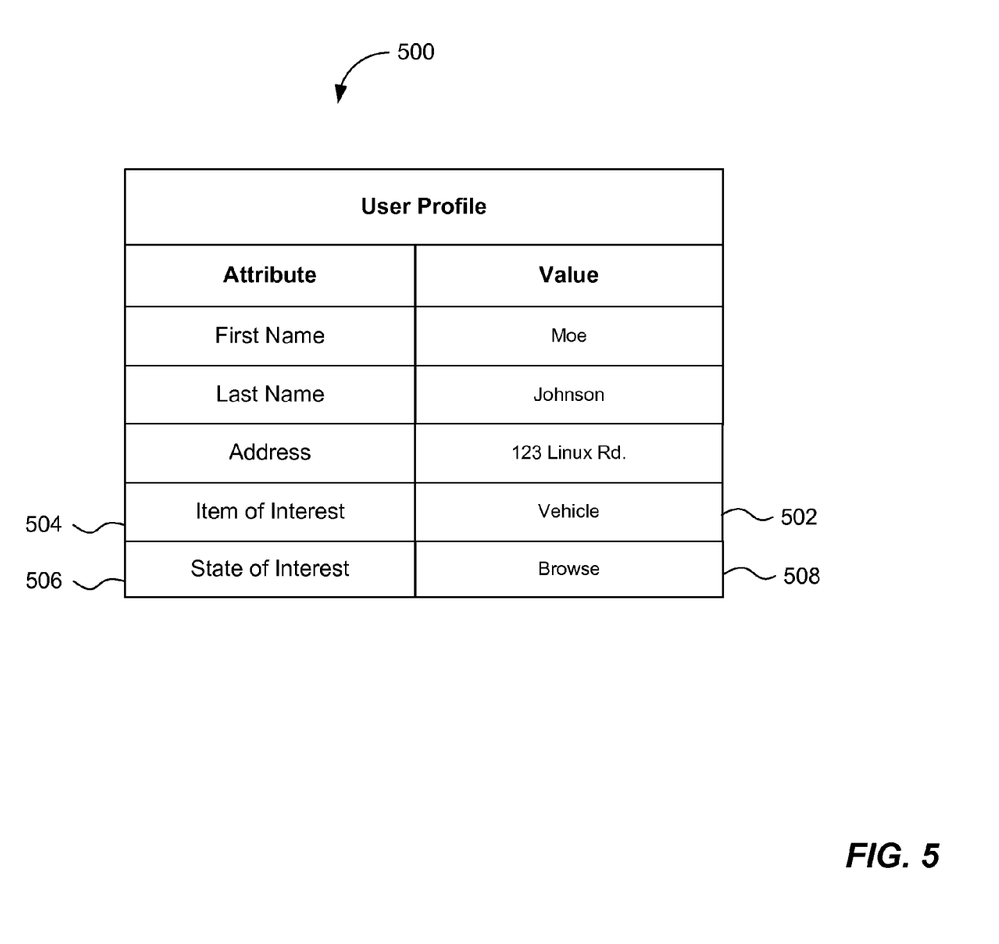
FIG. 5 depicts an exemplary user profile containing user indication of interest to browse for an item according to one embodiment.

FIG. 5 depicts an exemplary user profile containing user indication of interest to browse for an item according to one embodiment. Thus, the user profile 500 can include one or more attributes that user profile can contain as well as the corresponding values. For example, attributes such as first name, last name and address of the user can be stored in the profile. In addition, expressions of interest or preferences can also be stored in the user profile as part of data that is collected by the user behavior collection module 112. As discussed above, based on user behavior online, previous searches and other click-thorough information, a user profile can be refined in order to store items of interest of the user and the level of interest for each item.

For example, an item of interest attribute 504 as well as a value 502 can be stored as part of the user profile. The user profile 500 can have an associated value 502 that indicates that the user is interested in a vehicle. In addition, a state attribute 506 is indicative of the state of interest of the user in the item. Therefore, the state value 508 is indicative that the user's state of interest in the item is browsing. As such, the user profile 500 illustrates that the user is interested in vehicles but is in the browsing state. Utilizing this indication, the link destination selection module 110 can select the most relevant link destination such that once a user having the user profile 500 clicks on an advertisement the user will be presented with a browsing landing page to browse different vehicles.

Figure 6:
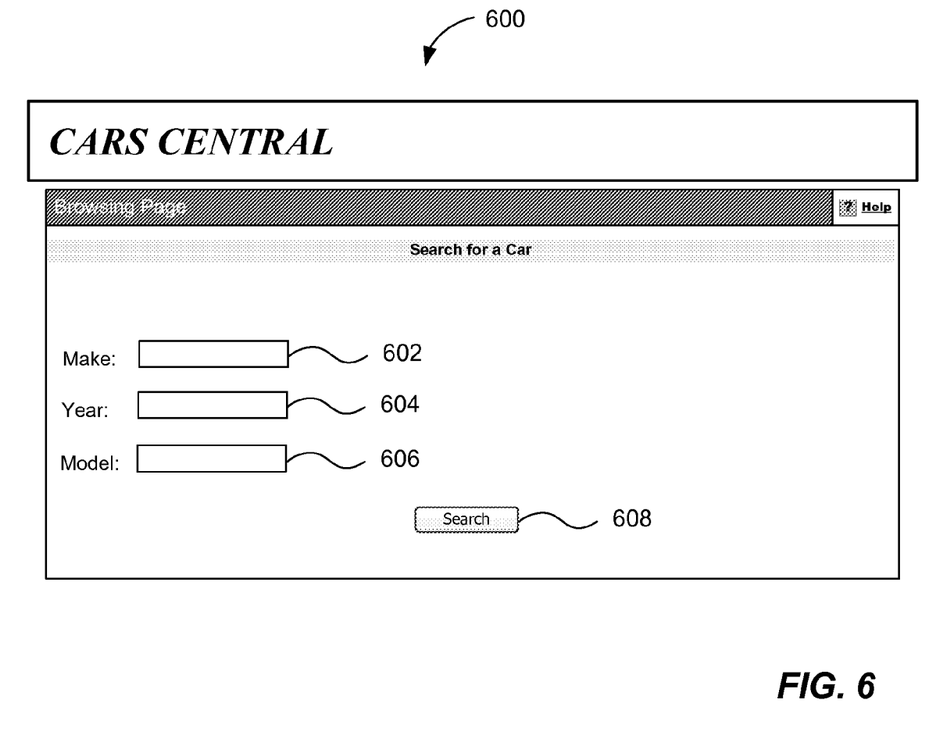
FIG. 6 depicts an exemplary user interface for displaying a landing page for browsing an item according to one embodiment.

FIG. 6 depicts an exemplary user interface for displaying a landing page for browsing an item according to one embodiment. The user interface 600 can be a web page of the advertiser of advertisements 404. Therefore, the advertisement 404 can be associated with a hyperlink to a landing page 600. The landing page 600 can allow a user to search for a car and browse multiple cars of different make, years or model. As such, the browsing page can, for example, have a field 602, 604 and 606 to select a make, year or model of the car. Likewise, a search or browse button 608 can be presented to the user as part of user interface 600. Other browsing pages can also be configured by the advertiser, depending on the advertisement strategy of the advertiser and where the advertiser would like browsing customers to be directed to.

Figure 7:
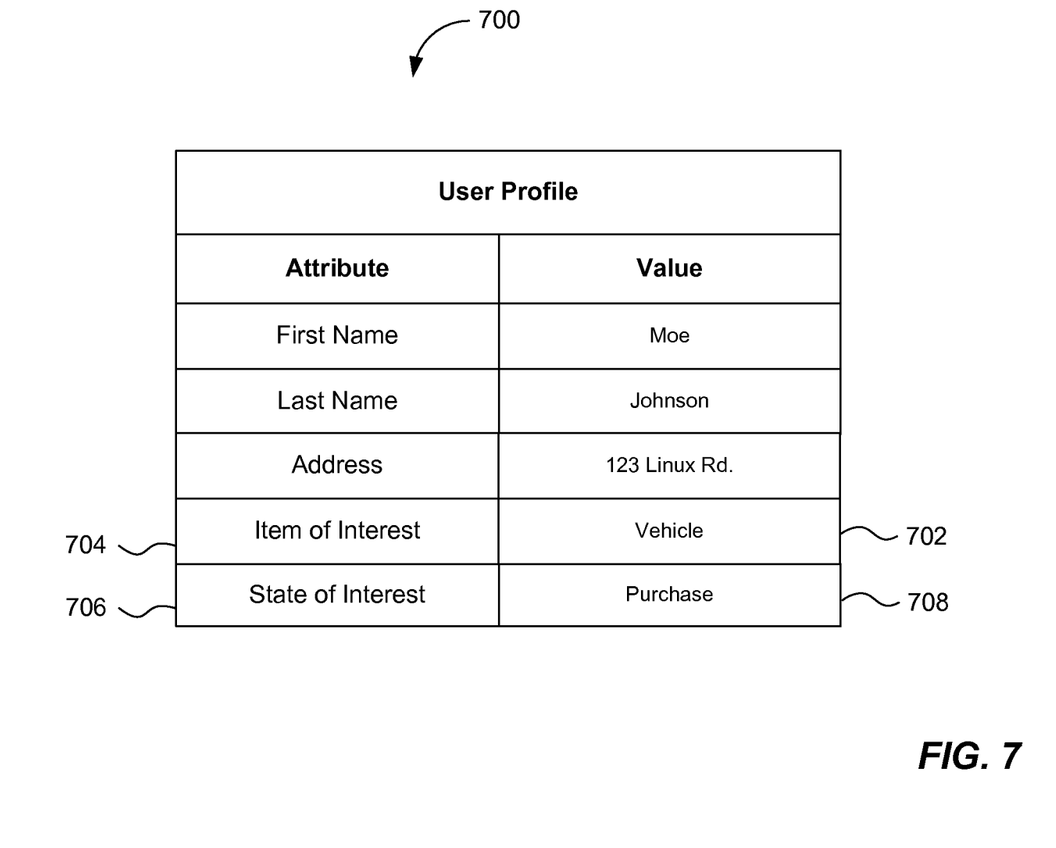
FIG. 7 depicts an exemplary user profile containing user indication of interests to purchase an item according to one embodiment.

FIG. 7 depicts an exemplary user profile containing user indication of interests to purchase an item according to one embodiment. User profile 700 also includes attributes and values that are indicative of user demographic information and other personal information of the user. In addition, profile 700 can also include an item of interest attribute 702 and a corresponding value 702. As such, the user profile 700 is indicative of a user interest on a vehicle. In addition, in state of interest attribute 706 can have a corresponding value 708. The corresponding value 708 can be indicative that the user is in a purchasing state. Therefore, the value 708 can is indicative that user is ready to purchase the item, in this case a vehicle.

In one embodiment, the link destination selection module 110 can access the user profile 700 at the user profile database 114 to determine the level of interest in a vehicle of the user associated with user profile 700. The link destination selection module 110 can associate the advertisement 402 to a hyperlink that is associated with a landing page corresponding to a purchasing or ordering web page.

Figure 8:
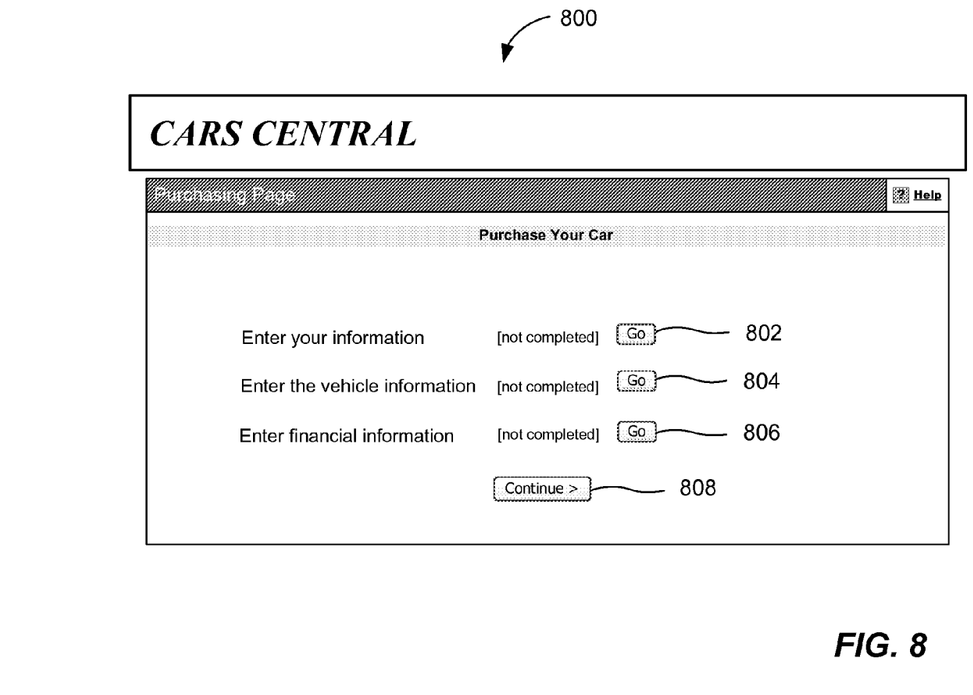
FIG. 8 depicts an exemplary user interface for displaying a landing page for purchasing an item according to one embodiment.

FIG. 8 depicts an exemplary user interface for displaying a landing page for purchasing an item according to one embodiment. In one example, the landing page of user interface 800 corresponds to a landing page wherein a user can enter information to purchase a vehicle. As such, the user interface 800 allows a user to enter information regarding the user at a button 802, the vehicle that the user wants to purchase at button 804, as well as financing information at button 806. Once the user completes all the information required to purchase the vehicle, the user can select a button 808 to continue to check out and purchase the vehicle.

As such, the user interface 800 can be a landing page associated with a hyperlink that was deemed appropriate and relevant to the user who is ready to purchase a vehicle. FIGS. 4-8 utilize an example within the context of purchasing an item (e.g., a vehicle). Of course, any item or service that can be listed or advertised online can be associated with a hyperlink that is relevant to the user according to the systems and methods disclosed herein. Therefore, as one skilled in the art will recognize, the advertisement provided in the web page of an advertisement provider 140 can be for any type of goods, such as books, software, media, electronics, sporting goods, vehicles, clothing and accessories, etc. In addition, advertisements or listings of any types of services such as web design, software development or any IT related service, home improvement or construction, media production, export/import, etc., can also be associated with hyperlinks relevant to the user's state of interest.

In addition, the advertisement for an item can be in any format now known or to become known. For example, the advertisements can a graphic, text, flash, video, or any other Internet media based format or protocol.

Other examples of presenting links relevant to the user include dynamically linking an advertisement to different advertisers. For example, if an item is co-branded by a first and a second advertiser, the advertisement can be hyperlinked to a webpage of the first advertiser if the first advertiser's website is more relevant to the profile of the user. Likewise, the advertisement can be hyperlinked to a webpage of the second advertiser if the webpage of the second advertiser is more relevant to profile of the user the website of the first advertiser.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosures covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:
   identifying, via a server over a network, network activity of a user, said network activity comprising actions performed by a user respective to resources provided by the server on the network;
   analyzing, via the server, said network activity, and based on said analysis, identifying an item from said resources;
   further analyzing, via the server, said network activity based on said identified item, and based on said analysis, determining a user behavior related to said item from said network activity, said user behavior indicating a type of network activity performed by said user in relation to said item;
   determining, via the server, a level of interest for the item based on said user behavior, said level of interest corresponding to a type of network activity performed by said user in relation to said item;
   identifying, via the server, a digital content item provided by a third party, said digital content item comprising interactive digital content associated with said item;

determining, via the server, a hyperlink for said digital content item based on said level of interest for said item, said hyperlink determination comprising analyzing the level of interest, and based on said analysis, determining a webpage provided by the third party, said hyperlink determination further comprising associating, via the server, the determined webpage with the hyperlink;

communicating, via the server, a user interface (UI) to a device of the user, said communication causing the UI to be displayed on a display of the user device, said displayed UI comprising at least a display of the digital content item;

receiving, via the server, a selection via the UI of the digital content item;

causing, via the computing device, said UI to be updated to display the associated webpage based on the hyperlink associated with the selected digital content item.

2. The method of claim 1, further comprising selecting the digital content item from a plurality of digital content items based on the indication of preference for the item.

3. The method of claim 1, further comprising storing the item and the user indication of preference in a user profile of the user.

4. The method of claim 1, wherein said type of network activity is an explicit action performed by the user respective to said item, wherein, based on said explicit action, said level of interest is determined to indicate a high level of interest in said item.

5. The method of claim 4, wherein said webpage is a network location that enables the direct interaction with said item.

6. The method of claim 4, wherein said explicit action includes an action selection from a group of actions consisting of: web requests for the item, search queries for the item, search results of the item, saved listings for the item, printing pages related to the item, emailing information about the item, viewing the item and uploading content related to the item.

7. The method of claim 1, further comprising:
analyzing the user behavior, and based on said analysis, determining an implicit action of the user related to the item.

8. The method of claim 7, wherein said implicit action comprises demographic information related to the user.

9. The method of claim 7, wherein said implicit action comprises action related to the item comprising search queries related to the item, previously selected content corresponding to the item and followed links related to the item.

10. The method of claim 7, wherein said wherein said type of network activity is based at least in part on said implicit action, wherein, based on said implicit action, said level of interest is determined to indicate a low level of interest in said item.

11. The method of claim 10, wherein said webpage is a network location that enables the interaction with different items and different variations of said item.

12. A server comprising:
a processor;
a non-transitory computer-readable storage medium for tangibly storing thereon program modules for execution by the processor, the program modules comprising:
logic executed by the processor for identifying, via the server over a network, network activity of a user, said network activity comprising actions performed by a user respective to resources provided by the server on the network;
logic executed by the processor for analyzing, via the server, said network activity, and based on said analysis, identifying an item from said resources;
logic executed by the processor for further analyzing, via the server, said network activity based on said identified item, and based on said analysis, determining a user behavior related to said item from said network activity, said user behavior indicating a type of network activity performed by said user in relation to said item;
logic executed by the processor for determining, via the server, a level of interest for the item based on said user behavior, said level of interest corresponding to a type of network activity performed by said user in relation to said item;
logic executed by the processor for identifying, via the server, a digital content item provided by a third party, said digital content item comprising interactive digital content associated with said item;
logic executed by the processor for determining, via the server, a hyperlink for said digital content item based on said level of interest for said item, said hyperlink determination comprising analyzing the level of interest, and based on said analysis, determining a webpage provided by the third party, said hyperlink determination further comprising associating, via the server, the determined webpage with the hyperlink;
logic executed by the processor for communicating, via the server, a user interface (UI) to a device of the user, said communication causing the UI to be displayed on a display of the user device, said displayed UI comprising at least a display of the digital content item;
logic executed by the processor for receiving, via the server, a selection via the UI of the digital content item;
causing, via the computing device, said UI to be updated to display the associated webpage based on the hyperlink associated with the selected digital content item.

13. The server of claim 12, wherein said type of network activity is an explicit action performed by the user respective to said item, wherein, based on said explicit action, said level of interest is determined to indicate a high level of interest in said item.

14. The server of claim 13, wherein said webpage is a network location that enables the direct interaction with said item.

15. The server of claim 12, further comprising:
logic executed by the processor for analyzing the user behavior, and based on said analysis, determining an implicit action of the user related to the item.

16. The server of claim 15, wherein said wherein said type of network activity is based at least in part on said implicit action, wherein, based on said implicit action, said level of interest is determined to indicate a low level of interest in said item, wherein said webpage is a network location that enables the interaction with different items and different variations of said item.

17. A non-transitory computer-readable storage medium tangibly encoded with computer-executable instructions, that when executed by a server, cause the server to perform a method comprising:
identifying, via the server over a network, network activity of a user, said network activity comprising actions performed by a user respective to resources provided by the server on the network;

analyzing, via the server, said network activity, and based on said analysis, identifying an item from said resources;

further analyzing, via the server, said network activity based on said identified item, and based on said analysis, determining a user behavior related to said item from said network activity, said user behavior indicating a type of network activity performed by said user in relation to said item;

determining, via the server, a level of interest for the item based on said user behavior, said level of interest corresponding to a type of network activity performed by said user in relation to said item;

identifying, via the server, a digital content item provided by a third party, said digital content item comprising interactive digital content associated with said item;

determining, via the server, a hyperlink for said digital content item based on said level of interest for said item, said hyperlink determination comprising analyzing the level of interest, and based on said analysis, determining a webpage provided by the third party, said hyperlink determination further comprising associating, via the server, the determined webpage with the hyperlink;

communicating, via the server, a user interface (UI) to a device of the user, said communication causing the UI to be displayed on a display of the user device, said displayed UI comprising at least a display of the digital content item;

receiving, via the server, a selection via the UI of the digital content item;

causing, via the computing device, said UI to be updated to display the associated webpage based on the hyperlink associated with the selected digital content item.

* * * * *